Oct. 8, 1935.   N. G. HORWITT ET AL   2,016,942
PICTURE FRAME
Filed March 5, 1934    4 Sheets-Sheet 1

NATHAN GEORGE HORWITT
MORRIS KATCHER
INVENTORS

BY *Emanuel Scheyer*

ATTORNEY

Oct. 8, 1935. N. G. HORWITT ET AL 2,016,942
PICTURE FRAME
Filed March 5, 1934 4 Sheets-Sheet 2

NATHAN GEORGE HORWITT
MORRIS KATCHER
INVENTORS

BY Emanuel Scheyer

ATTORNEY

Oct. 8, 1935.  N. G. HORWITT ET AL  2,016,942
PICTURE FRAME
Filed March 5, 1934   4 Sheets-Sheet 3

NATHAN GEORGE HORWITT
MORRIS KATCHER
INVENTORS

BY Emanuel Scheyer

ATTORNEY

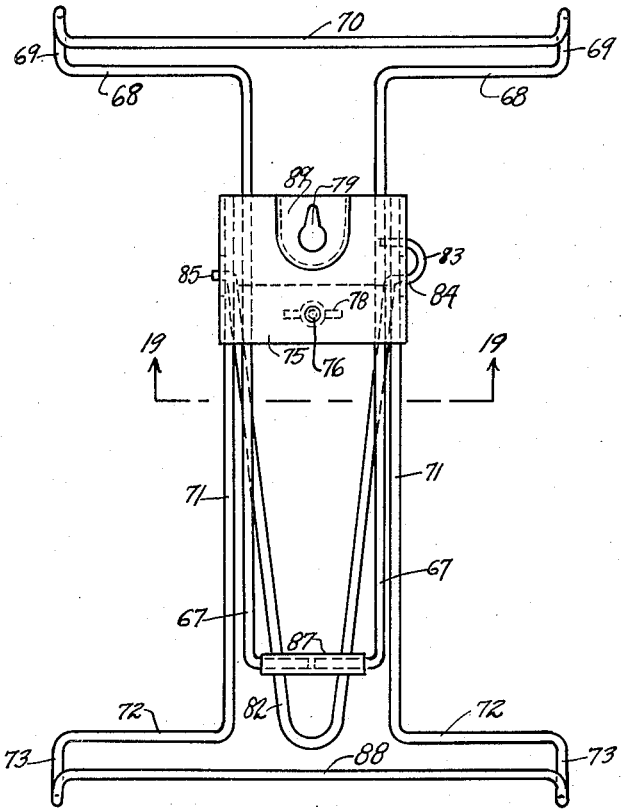

Patented Oct. 8, 1935

2,016,942

UNITED STATES PATENT OFFICE 2,016,942

PICTURE FRAME

Nathan George Horwitt and Morris Katcher, New York, N. Y., assignors to Design Engineers, Incorporated, New York, N. Y.

Application March 5, 1934, Serial No. 714,011

5 Claims. (Cl. 40—152.1)

This invention relates to an adjustable frame for supporting pictures, mirrors, plaques or other similar objects. It comprises a number of improvements on the frame as disclosed in application Serial No. 645,338 of N. G. Horwitt. Our frame can be used to support objects of different sizes. With our construction, it is not necessary as is the usual practice at present, to make a frame to order to suit pictures or mirrors, etc. of each particular size. Our frame is composed of parts slidable over each other, which can be set, within predetermined limits, to embrace and support objects of various sizes. Rubber bumpers are provided extending within and behind the supporting channel or cross-piece at the bottom of the frame. These bumpers assist in holding the picture, with its glass and backing, in the frame, and serve, where the frame is hung on the wall, to prevent by friction the displacement of the frame from its proper hanging position. The part provided on the back of the frame for hanging it on the wall is offset where the slot is located, so that the slot extends away from the plane of the picture. This facilitates the entrance of a hook or nail on the wall into the slot when it is desired to hang the frame. Several types of supporting legs or easel rods are provided for standing the frame on a surface. In one type the rod is fastened to the tongue by means of a bolt engaging the slot. In other types the rod is hinged to the back of the frame, with a slot provided in the rod should it be desired to hang the frame instead of supporting it by its rod. The slot in the rod extends away from the plane of the picture. A further improvement consists in the attachment and mounting of a lamp shell with socket and switch for use with an electric lamp to light the front of the picture.

A modified construction of the frame is shown in which the parts are formed to a great extent of bent wire.

Other objects and advantages will become apparent upon further study of the specifications and drawings, in which:—

Fig. 17 is a front elevation of a modified form of the frame made up principally of bent wire.

Fig. 18 is a side elevation of the frame of the type shown in Fig. 17, and

Fig. 19 is a section taken along the line 19—19 of Fig. 17.

Figure 1:
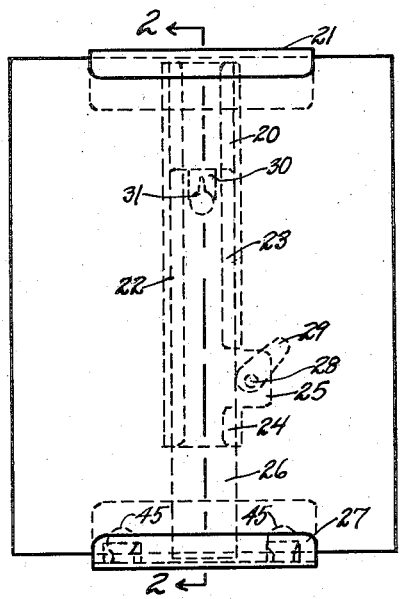
Fig. 1 is a front elevation of my frame used in connection with a picture.
Figure 2:
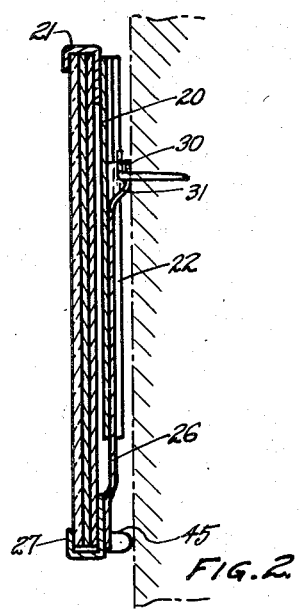
Fig. 2 is a section along the line 2—2 of Fig. 1 showing in addition the frame being suspended from a hook in a wall.
Figure 4:
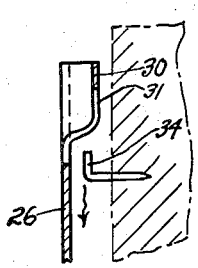
Fig. 4 is an enlarged view of a part of the upper end of the lower stem of the frame showing the attaching eyelet or slot.
Figure 5:
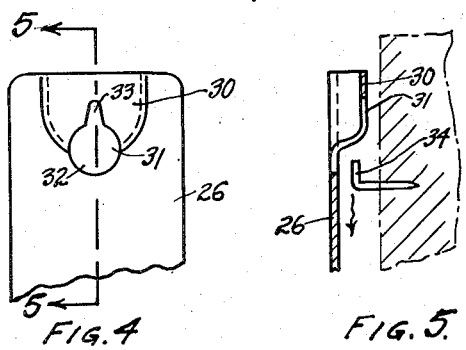
Fig. 5 is a section along the line 5—5 of Fig. 4, showing in addition nearby a wall having a projecting hook upon which the frame is about to be hung.

The upper portion of the frame, Figs. 1 and 2, is T shaped having a stem 20 with a channel shaped head or cross-piece 21 fastened to it. Stem 20 is bent back on itself to form guide flanges 22, 23 and 24. Flanges 23 and 24 are on the same side of stem 20 but are spaced from each other sufficiently to permit tongue 25 of stem 20 to come between them. The lower portion of the frame is also T shaped with a stem 26 and a channel shaped head or cross-piece 27. Stem 26 is adapted to slide on the rear face of stem 20, inside of guide flanges 22, 23 and 24. Pivotally mounted by means of pin 28, on the rear of tongue 25 is an eccentric catch 29, for locking stem 26 in various up and down positions on stem 20. The upper part of stem 26, Figs. 1 to 6 inc., is stamped out to form a projection 30. A keyhole shaped eyelet 31 is provided in the upper part of stem 26, the large portion 32 of the eyelet being partially on the flat portion of said stem and partially on the stamped out projection 30, following along with said projection as it extends outwardly from the flat portion of the stem. The small tapered portion 33, Fig. 4, extends upward and is altogether on projection 30, extending in a plane substantially parallel to the flat portion of stem 26. Having portion 32 extending in a direction away from the flat portion of stem 26, adapts it for easy engagement with the upstanding portion of a hook 34, Fig. 5, when the frame is set against a wall 35 and moved in the direction indicated by the arrow.

Figure 3:
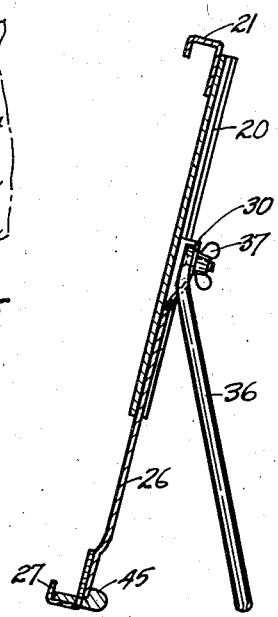
Fig. 3 is a section taken similarly to Fig. 2, except that the frame is shown supported by a leg, and nothing is shown held by the frame.

In Fig. 3, a supporting leg 36 is set in eyelet 31 and fastened in position by a screw and wing nut 37. Eyelet 31, being in lower stem 26, remains at a fixed distance from the supporting surface, irrespective of how much upper and lower cross-pieces 21 and 27 are separated to suit different sizes of pictures.

Figure 6:
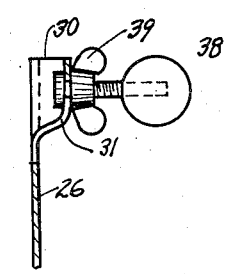
Fig. 6 is a section taken similarly to Fig. 5, except that the ball part of a ball and socket joint is shown fastened to the frame.

In Fig. 6, the ball part 38 of a ball and socket joint is shown fastened in eyelet 31 by means of a screw and wing nut 39. The socket part of the joint, not shown, can be mounted on a tripod or other support for providing in cooperation with ball 38, a universal mounting for the frame. The frame under these conditions would be of use for supporting a sheet of fiber board or other suitable vehicle providing a surface for an artist to work upon.

Figure 7:
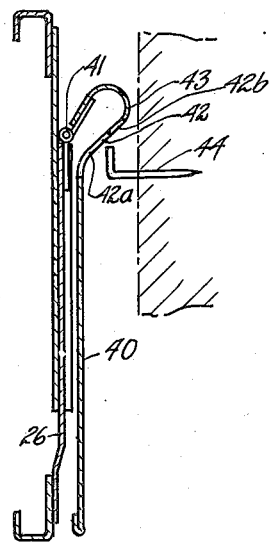
Fig. 7 is a section of a modified form of my frame showing a hinged supporting leg, said leg being set in close to the frame in position for hanging the frame on a hook shown projecting from a wall.
Figure 8:
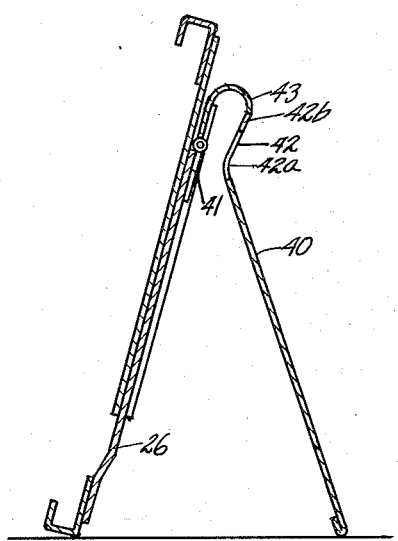
Fig. 8 is a section of the frame shown in Fig. 7, except that the supporting leg is in extended position for supporting the frame on a horizontal surface.
Figure 9:
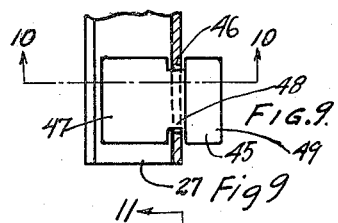
Fig. 9 is a fragmental sectional plan of the bottom cross-piece of a frame showing a rubber bumper set in position.

Instead of having the eyelet located as just described, and a leg like that already shown, the modification of our construction illustrated in Figs. 7 and 8 could be used. Here a leg 40, having a looped upper portion, is attached by means of hinge 41 to the upper end of stem 26. An eyelet, denoted in its entirety by numeral 42 is provided near the upper end of leg 40. As in Figs. 4 and 5, the large portion 42a of the eyelet 42 extends from the flat portion of leg 40 to the offset portion 43 of said leg, the small tapered portion 42b of eyelet 42 being well out on offset portion 43. This adapts the eyelet for easy engagement with the upstanding portion of a hook 44.

A bumper, of rubber or other suitable flexible resilient material, denoted in its entirety by the numeral 45, Figs. 1, 2, 3, 9, 10 and 11, is provided, near each end of the bottom cross-piece 27. Each bumper is inserted through a hole 46 in the rear flange of cross-piece 27. Said bumper has a flat plate-like portion 47 connected by a necked-in portion 48 with a bulbular portion 49. Flat portion 47 rests inside the cross-piece 27 on its web, with the necked-in portion 48 fitting in the bottom of a hole 46 at the widened portion of said hole. Said flat portion grips the bottom of whatever is held by the frame compensating for any unevenness present. Bulbular or thickened portion 49 extends to the rear of cross-piece 27, acting as a cushion between the frame and the wall when the frame is hung on a wall. It also serves as a friction grip between the frame and the wall to prevent disarrangement of the frame from a proper hanging position. The length of flat portion 47 is greater than that of the widened portion of the hole to prevent the bumper from falling out of the hole. The bumper is inserted into the hole from the rear of cross-piece 27 by curling (not shown) flat portion 47 to fit the upper curved portion of the hole. When inserted far enough in to reach the necked-in portion 48, flat portion 47 is allowed to uncurl, whereupon said bumper is locked in position on the cross-piece. In addition to the bumpers 45 shown, others may be used in cross-piece 21.

Figure 12:
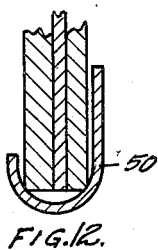
Fig. 12 is a section of a curved bottom cross-piece of the frame showing a fragment of a picture held therein.
Figure 10:
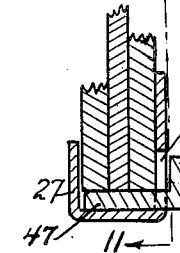
Fig. 10 is a partial section taken along the line 10—10 of Fig. 9, showing in addition a portion of a picture held in the lower cross-piece.
Figure 11:
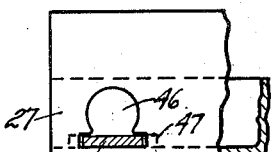
Fig. 11 is a sectional elevation taken along the line 11—11 of Fig. 10, with the picture omitted.

Instead of using a channel-shaped cross-piece, such as cross-piece 27, a U-shaped cross-piece 50 may be used as shown in Fig. 12. The latter has the advantage that it will readily grip objects of various thicknesses held in the frame.

In Figs. 13 to 16 inc., another modification of our frame is shown, which involves the use of an electric lamp to illuminate the picture. As in the other types, an upper cross-piece 51 is provided with a downwardly extending stem 52 having guide flanges similar to flanges 22, 23 and 24, Fig. 1. Stem 53 of lower cross-piece 54, has a supporting leg 55 attached to it by means of hinge 56. Leg 55 has a portion 57 extending upward beyond hinge 56. Portion 57 is provided with a keyhole slot 58. It is to be noted that portion 57 is at an angle with the rest of leg 55. When the frame is to be hung from a hook on the wall, the lower part of leg 55 is swung close to stem 53, causing portion 57 to extend back, thus presenting slot 58 at an angle to the hook in the wall after the manner of that shown in Figs. 5 and 7.

Figure 14:
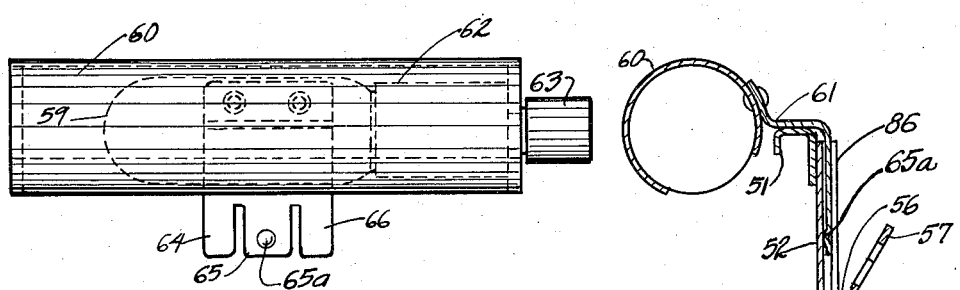
Fig. 14 is a front elevation of the shade and support shown removed from the frame and with a lamp, socket and switch shown mounted in said shade.
Figure 16:
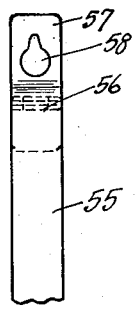
Fig. 16 is a fragmental rear elevation of the upper portion of the attaching leg with its hinge for the frame of Fig. 13.
Figure 15:
Fig. 15 is a section through the center of the means for attaching the shade to the frame, shown by itself.
Figure 13:
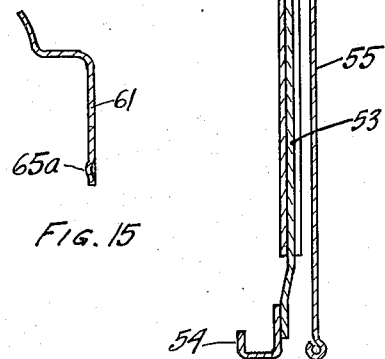
Fig. 13 is a section of a modified form of the frame having mounted thereon a shade and support for an electric light.

As an added feature a lamp 59 and shade 60 are mounted upon the upper portion of the frame, extending in front of the frame in position to illuminate a picture held in the frame. Referring to Figs. 13, 14 and 15, shade 60 is provided with a downwardly extending plate attaching member, denoted in its entirety by the numeral 61, the lower portion of said member being slotted to form tongues 64, 65 and 66. Tongue 65 is provided with a teat 65a. Member 61 is forced into the upper end of stem 52, tongues 64 and 66 entering the guides of said stem, one of which is shown at 86, said guides being similar to guides 22 and 23 provided for stem 20, Fig. 1. Teat 65a presses forward with spring pressure against the web of stem 52 causing tongues 64 and 66 to press back against the guides of said stem. The upper end of attaching member 61 is riveted to shade 60. A lamp socket 62 for lamp 59, is mounted in the right hand end of shade 60, a socket switch 63 being operatively connected to said lamp socket.

In Figs. 17, 18 and 19 is illustrated a form of our frame constructed chiefly of bent wire. The upper member of the frame is made of a length of wire formed with downwardly extending legs 67 which have their ends held in sleeve 87. Extending from the upper end of each leg 67, and at right angles thereto, is a horizontal stretch of wire 68. Arching upwardly and forwardly from the outer end of each stretch of wire 68 is a loop 69. Extending substantially horizontally between the forward ends of loops 69, is a portion of wire 70 substantially parallel to stretches of wire 68. Portions 68, 69 and 70 form the upper cross-piece of the frame with legs 67 constituting the stem. In a similar manner, the lower member of the frame is constructed. A length of wire is formed into legs 71, with a horizontal stretch of wire 72 extending at right angles from the lower end of each of said legs. Arching downwardly and forwardly from the outer end of each stretch of wire 72 is a loop 73. Extending substantially horizontally between the forward ends of loops 73, is a portion of wire 88 substantially parallel to stretches of wire 72.

Fastened upon the upper ends of legs 71 by means of loops 74, is a sheet metal plate 75. A screw 76 extends toward the rear of the frame through a suitable hole provided in plate 75. A clamping plate 77 is mounted over the shank of screw 76 and retained thereon by wing nut 78. The outer ends of clamping plate 77 are curved to fit over legs 67. Tightening clamping plate 77, by screwing down on wing nut 78, will hold the upper and lower members of the frame in various predetermined relationships to suit the size of picture to be held, the picture being mounted (not shown) between loops 69 and loops 73.

A keyhole slot 79 is provided in offset portion 89 of plate 75 for the insertion therethrough of a hook when it is desired to mount the frame on a wall. In a manner similar to that shown in Fig. 5, slot 79 extends in a direction away from the flat portion of plate 75. Extending rearwardly from plate 75 are ears 80. When it is desired to mount the frame as an easel, the upper ends of U shaped leg 82 are inserted in suitable holes provided in ears 80. One side of leg 82 is provided with an offset portion 83 having a shoulder 84. The other side has a bent portion 85. Offset portion 83 is inserted through the hole of one of the ears 80 until shoulder 84 rests therein. Then by springing the sides of leg 82 together, bent portion 85 may be inserted into the hole of the other ear 80.

In the claims, the frame is specified as supporting a picture, but we wish it to be understood that other objects such as the glass cover for the picture, mirrors and plaques are meant as well.

We claim:—

1. A frame for supporting a picture comprising an upper and a lower cross-piece formed to hold opposite ends of the picture, an extension for each cross-piece and joined thereto, a releasable catch for adjustably locking said extensions to each other whereby said cross-pieces can be set to the size of the picture, hinging means mounted upon the extension of the lower cross-piece near its upper end, a part in the form of a loop, one leg of the loop being connected to said latter extension, the other leg of the loop being provided with an opening, said part adapted to be turned to have the leg with the opening extend in a direction away from the rear of said latter extension for the mounting of the frame upon a support having a substantially vertically extending portion, whereby when said frame, held in a substantially vertical position with said latter leg extending away, is moved downwardly upon said substantially vertically extending portion, said opening will receive said support, and a member extending downwardly from said latter leg adapted to serve as a supporting leg for said frame when swung away from the frame.

2. A frame for supporting a picture comprising an upper and a lower cross-piece formed to hold opposite ends of the picture, an extension for each cross-piece and joined thereto, a releasable catch for adjustably locking said extensions to each other whereby said cross-pieces can be set to the size of the picture, a part attached to the extension of said lower cross-piece near the upper end of said latter extension, said part extending in a direction away from the rear of said latter extension generally parallel to a plane which intersects the plane of a picture supported in said frame in a substantially horizontal line, said part being provided with an opening having a portion extending away in said direction, a supporting leg inserted through said opening, the upper portion of said leg making an angle with the lower portion, and releasable fastening means engaging said part and the upper portion of said leg for removably fastening the leg to said part, said upper portion when fastened to said part extending in a direction generally parallel to said plane of the picture.

3. A frame for supporting a picture comprising an upper and a lower cross-piece formed to hold opposite ends of the picture, an extension for each cross-piece and joined thereto, said extensions being slidably mounted upon each other, a releasable catch for locking said extensions against relative motion, whereby said cross-pieces can be set to the size of the picture, and a part attached to the extension of said lower cross-piece near the upper end of said latter extension, a portion of said part extending in a direction away from the rear of said latter extension and another portion of said part, immediately adjacent to said former portion, extending in a direction substantially parallel to the extensions of the cross-pieces, said part being provided with an opening located partly in said former portion and partly in said latter portion.

4. A frame for supporting a picture, comprising an upper and a lower cross-piece formed to hold opposite ends of the picture, an extension for each cross-piece and joined thereto, the extensions being movably mounted upon each other with the cross-pieces oppositely disposed whereby said cross-pieces can be set to the size of the picture, an elongated member formed of a flat strip of material of substantial width, hinging means for hingedly mounting said member upon the rear of the extension of the lower cross-piece near the upper end thereof, said means being located between the forward face of said member and the rear of the latter extension, said member being bent to incline upwardly and rearwardly from the rear face of said latter extension at a point above the pivotal axis of the hinging means, the portion of said member below the hinging means serving as an easel leg, said member having a hole in the inclined portion above said axis, said inclination being sufficient for the mounting of the member upon a support having a substantially vertically extending portion, by the insertion of said portion through the hole while the frame is held in substantially vertical position.

5. A frame for supporting a picture, comprising an upper and a lower cross-piece formed to hold opposite ends of the picture, an extension for each cross-piece and joined thereto, the extensions being movably mounted upon each other with the cross-pieces oppositely disposed whereby said cross-pieces can be set to the size of the picture, an elongated member formed of a flat strip of material of substantial width, a hinge having a pair of leaves rotatably mounted upon each other, one leaf being fastened to the back of the extension of the lower cross-piece, the other leaf fastened to the front of said member, said member being bent to incline upwardly and rearwardly from the rear face of said latter extension at a point above the pivotal axis of the hinge, the portion of said member below the hinging means serving as an easel leg, said member having a hole in the inclined portion above said axis, said inclination being sufficient for mounting of the member upon a support having a substantially vertically extending portion, by the insertion of said portion through the hole while the frame is held in substantially vertical position.

NATHAN GEORGE HORWITT.
MORRIS KATCHER.